United States Patent
Masuda et al.

(10) Patent No.: US 8,509,784 B2
(45) Date of Patent: Aug. 13, 2013

(54) MOBILE COMMUNICATION METHOD, RADIO CONTROL STATION, AND RADIO BASE STATION

(75) Inventors: Masafumi Masuda, Yokosuka (JP); Yasuhiro Kawabe, Yokosuka (JP); Takaaki Sato, Kawasaki (JP); Ryoji Yamamoto, Fujisawa (JP); Katsuhiko Yamagata, Fujisawa (JP)

(73) Assignee: NTT DoCoMo, Inc., Tokyo (JP)

( * ) Notice: Subject to any disclaimer, the term of this patent is extended or adjusted under 35 U.S.C. 154(b) by 157 days.

(21) Appl. No.: 12/742,659

(22) PCT Filed: Nov. 11, 2008

(86) PCT No.: PCT/JP2008/070508
§ 371 (c)(1),
(2), (4) Date: Jul. 20, 2010

(87) PCT Pub. No.: WO2009/063868
PCT Pub. Date: May 22, 2009

(65) Prior Publication Data
US 2010/0298002 A1    Nov. 25, 2010

(30) Foreign Application Priority Data
Nov. 13, 2007    (JP) ................................ 2007-294682

(51) Int. Cl.
*H04W 36/00*    (2009.01)
(52) U.S. Cl.
USPC ...... 455/443; 455/452.1; 455/436; 455/422.1
(58) Field of Classification Search
USPC .............................. 455/443, 452.1, 436, 422.1
See application file for complete search history.

(56) References Cited

U.S. PATENT DOCUMENTS

| 5,524,278 | A  | * | 6/1996  | Williams et al. | .............. 455/434 |
| 6,463,054 | B1 | * | 10/2002 | Mazur et al.    | .................. 370/352 |

(Continued)

FOREIGN PATENT DOCUMENTS

| CN | 1338191 A   | 2/2002 |
| JP | 2003 219449 | 7/2003 |
| JP | 2006 229384 | 8/2006 |
| WO | 2007 055221 | 5/2007 |

OTHER PUBLICATIONS

3GPP TS25.331 V.7.6.0, 3rd Generation Partnership Project; Technical Specification Group Radio Access Network; Radio Resource Control (RRC); Protocol Specification (Release 7), pp.1-1460 (Sep. 2007).

(Continued)

*Primary Examiner* — Chuong A Ngo
(74) *Attorney, Agent, or Firm* — Oblon, Spivak, McClelland, Maier & Neustadt, L.L.P.

(57) ABSTRACT

A mobile communication method according to the present invention includes a step A of causing a mobile station in a standby mode in a first cell to transmit a communication start request signal, a step B of judging whether or not to measure communication quality of a second cell on the basis of judgment as to whether or not the particular service is provided in each of the cells and judgment as to whether or not communication quality of the second cell is included in the communication start request signal, the second cell overlaid by the first cell in a different frequency band and a step C of starting communication of the mobile station in either one of the first cell and the second cell on the basis of the measured communication quality of the second cell.

6 Claims, 4 Drawing Sheets

(56) References Cited

U.S. PATENT DOCUMENTS

| | | | |
|---|---|---|---|
| 2004/0229626 A1* | 11/2004 | Yi et al. | 455/450 |
| 2005/0059403 A1* | 3/2005 | Wang | 455/446 |
| 2007/0060091 A1* | 3/2007 | Kim et al. | 455/266 |
| 2009/0186623 A1* | 7/2009 | Matsuzawa | 455/447 |
| 2009/0268673 A1 | 10/2009 | Roberts | |

OTHER PUBLICATIONS

Office Action issued Jul. 4, 2012 in Chinese Application No. 200880115800.0 (With English Translation).

Office Action issued Jan. 4, 2013, in Chinese Patent Application No. 200880115800.0, with English translation.

* cited by examiner

| CELL ID | FREQUENCY BAND | SPREADING CODE | PRESENCE OR ABSENCE OF EUL SERVICE BEING PROVIDED |
|---|---|---|---|
| 0 x 01 | 0 x 0101 : 825.0MHz | 0 x 1234 | 0 x 00 : NOT PROVIDED |
| 0 x 02 | 0 x 0102 : 830.0MHz | 0 x 1234 | 0 x 01 : PROVIDED |

MOBILE COMMUNICATION METHOD, RADIO CONTROL STATION, AND RADIO BASE STATION

TECHNICAL FIELD

The present invention relates to a mobile communication method, a radio control station, and a radio base station used in a mobile communication system in which a cell providing a particular service and a cell not providing the particular service overlay each other in different frequency bands.

BACKGROUND ART

In recent years, 3GPP (3rd Generation Partnership Projects) has specified a mobile communication system called a "W-CDMA (Wideband-Code Division Multiple Access) system (or UMTS: Universal Mobile Telecommunications System)" based on CDMA (Code Division Multiple Access) techniques.

FIG. 1 shows a configuration example of the W-CDMA system. As shown in FIG. 1, the W-CDMA system includes a mobile station UE (User Equipment), a radio base station NodeB, a radio control station RNC (Radio Network Controller), and an exchange MSC/SGSN (Mobile Switching Center/Serving GPRS Support Node), thereby configuring a cellular mobile communication system.

Radio waves transmitted from the radio base station NodeB form an area called a "Cell" which serves as a control unit in the cellular system.

In the W-CDMA system, a cell is identified by a combination of a frequency band of a pilot channel and a spreading code called a "Primary Scrambling Code." Usually, a pilot channel is linked with a cell on a one-to-one basis.

Here, the W-CDMA system can employ a configuration in which cells covering a geographically identical area but using different frequency bands for transmission of pilot channels overlay each other.

In the example of FIG. 1, a cell 01 and a cell 02 cover a geographically identical area while a cell 03 and a cell 04 cover another geographically identical area. Moreover, a frequency band 01 is allocated to the cell 01 and the cell 03 while a frequency band 02 is allocated to the cell 02 and the cell 04.

Here, a communication capacity is limited with a single frequency band since a bandwidth of a frequency band is defined. However, overlaying the cells to which the different frequency bands are allocated in the above described manner allows expansion of a communication capacity at the same spot.

The following methods are devised as communication setting methods in the configuration in which multiple cells employing different frequency bands overlay each other. One of the methods is a method of causing a mobile station UE which is in a standby mode in any of cells to set up communication only in the cell in which the mobile station UE is in the standby mode at the time of starting communication. The other one of the methods is a method of causing a mobile station UE to set up communication in a cell employing a different frequency band from that of a cell in which the mobile station UE is in the standby mode so as to achieve flexible load balancing.

In the latter case, communication qualities of the respective overlaid cells are not always the same. For this reason, it is usual to measure communication quality of a cell employing different frequency band by some means and to judge in advance whether or not it is possible to set up communication in the cell employing the different frequency band.

Here, the "communication quality" includes an electric field intensity of a pilot channel, a ratio (SIR: Signal To Interference Ratio) of an electric field intensity of a desired wave to an electric field intensity of an interference wave, an electric field loss, and the like.

When the communication quality is determined to be sufficient by a threshold judgment using these communication quality factors, the mobile station UE performs communication setting even in the cell employing the frequency band separate from that of the cell in which the mobile station UE is in the standby mode. If not so determined, the mobile station UE does not perform communication setting in the cell employing the frequency band separate from that of the cell in which the mobile station UE is in the standby mode.

Meanwhile, as means for acquiring the communication quality of the cell employing the frequency band separate from that of the cell in which a mobile station UE is in the standby mode (a standby cell), there is known a method of causing the mobile station UE to measure the communication quality of the cell employing the different frequency band during the mobile station UE is in the standby mode in advance and to notify the radio control station RNC of a measurement result with the measurement result included in a communication start request signal.

Meanwhile, "JP-A No. 2003-219449" discloses the following procedure in which a mobile station UE which is in a standby mode in a cell does not measure communication quality of a cell employing a different frequency band. In the procedure, a radio control station RNC executes cell selection processing in the course of a communication setting procedure on the basis of the communication quality of the cell in which the mobile station UE is in the standby mode. When it is not possible to select the standby cell, the radio control station RNC requests the mobile station UE to measure communication quality of a cell employing a separate frequency band and thus acquires the communication quality of the cell employing the separate frequency band.

In this procedure, the mobile station UE does not measure the communication quality of the cell employing the separate frequency band in the standby mode but executes the measurement of the communication quality of the cell employing the separate frequency band only when it is not possible to select the standby cell. This allows the mobile station UE in the standby mode to reduce the power consumption thereof.

In the meantime, communication services provided respectively in such overlaying cells may be different from each other because of reasons of installation and construction of the provider, such as costs and installation of equipment.

Examples of such communication services include an "HSDPA (High-Speed Downlink Packet Access) service", an "HSUPA (High-Speed Uplink Packet Access) or EUL (Enhanced Uplink) service", and the like, which have been progressively introduced.

These are the communication services for an uplink and a downlink included in a new version of 3GPP standards such as "Release 5" or "Release 6", which can perform high-throughput and high-efficiency communication as compared to a conventional "Release 99 (for uplink and downlink) service".

In the example of FIG. 1, an EUL service is provided only in the cell 02 but not in the cell 01.

In that case, even if a mobile station is an "EUL support mobile station" provided with a communication capability for the EUL service, when the mobile station is to set up communication in the cell 01, communication for a low-speed Release 99 (uplink) service is set up instead of communication for the EUL service. Only when the mobile station is to set up the communication in the cell 02, the communication for the EUL service is allowed to be set up.

Assume a case of employing the above-described form of providing the EUL service. According to the method disclosed in "JP-A No. 2003-219449", the cell selection is executed based on the communication quality. Only when it is not possible to select the standby cell, the communication quality of the cell employing the separate frequency band is measured or the cell employing the separate frequency band is selected. Therefore, the EUL support mobile station which is in the standby mode in the cell 01 does not perform measurement of the communication quality in the cell 02 or cell selection of the cell 02 as far as the communication quality in the cell 01 is sufficient, but sets up the communication for the Release 99 (uplink) service in the cell 01 at the time of starting the communication.

Alternatively, instead of the method disclosed in "JP-A No. 2003-219449", a method of setting up the communication uniformly in the cell 02 is conceivable in order to set up the communication for the EUL service. However, in that case, because of non-execution of measurement on the communication quality in the cell 02, the communication may be performed with poor communication quality.

As described previously, according to the conventional technique, the following problems are involved in a structure in which a cell A that provides a particular service (a particular communication service) and a cell B that does not provide the particular service overlay each other in different frequency bands. One of the problems is that the particular service is less frequently provided due to occurrence of a case where setting up communication for the particular service is failed. Another one of the problems is that if the communication for the particular service is set uniformly in the cell A in order to prevent the reduction in frequency, the communication may be performed at poor communication quality, thereby arising a concern for degradation in a service performance.

DISCLOSURE OF THE INVENTION

The present invention has therefore been made in view of the above-described problems and an object of the present invention is to provide a mobile communication method, a radio control station, and a radio base station which are used in a configuration in which a cell providing a particular service and a cell not providing the particular service overlay each other in different frequency bands, the mobile communication method, the radio control station, and the radio base station enabling degradation in a service performance to be prevented by eliminating a possibility of performing communication at poor communication quality while preventing reduction in frequency to provide the particular service.

The first feature of the present invention relates to a mobile communication method for a mobile communication system having a configuration in which a cell providing a particular service and a cell not providing the particular service overlay each other in different frequency bands. The mobile communication method includes a step A of causing a mobile station in a standby mode in a first cell to transmit a communication start request signal, a step B of judging whether or not to measure communication quality of a second cell on the basis of judgment as to whether or not the particular service is provided in each of the cells and judgment as to whether or not communication quality of the second cell is included in the communication start request signal, the second cell overlaid by the first cell in a different frequency band, and a step C of starting communication of the mobile station in either one of the first cell and the second cell on the basis of the measured communication quality of the second cell.

In the first feature of the present invention, the judgment as to whether or not to measure the communication quality of the second cell may be made in the step B further on the basis of at least one of a communication capability of the mobile station and judgment as to whether or not it is necessary to provide the particular service to the mobile station.

In the first feature of the present invention, the communication of the mobile station may be started in either one of the first cell and the second cell in the step B on the basis of the communication quality of the second cell included in the communication start request signal.

The second feature of the present invention relates to a radio control station used in a mobile communication system having a configuration in which a cell providing a particular service and a cell not providing the particular service overlay each other in different frequency bands. The radio control station includes a judgment unit configured to judge whether or not to measure communication quality of a second cell on the basis of at least one of a case where a mobile station in a standby mode in a first cell transmits a communication start request signal and/or judgment as to whether or not communication quality of the second cell is included in the communication start request signal, the second cell overlaid by the first cell in the different frequency band, and a communication unit configured to start communication of the mobile station in either one of the first cell and the second cell on the basis of the measured communication quality of the second cell.

In the second feature of the present invention, the judgment unit may be configured to judge whether or not to measure the communication quality of the second cell further on the basis of at least one of a communication capability of the mobile station and judgment as to whether or not it is necessary to provide the particular service to the mobile station.

In the second feature of the present invention, the communication unit may start the communication of the mobile station in either one of the first cell and the second cell on the basis of the communication quality of the second cell included in the communication start request signal.

The third feature of the present invention relates to a radio base station used in a mobile communication system having a configuration in which a cell providing a particular service and a cell not providing the particular service overlay each other in different frequency bands. The radio base station includes a judgment unit configured to judge whether or not to measure communication quality of a second cell when a mobile station in a standby mode in a first cell transmits a communication start request, on the basis of at least one of judgment as to whether or not the particular service is provided in each of the cells and judgment as to whether or not communication quality of the second cell is included in the communication start request signal, the second cell overlaid by the first cell in the different frequency band, and a communication unit configured to start communication of the mobile station in either one of the first cell and the second cell on the basis of the measured communication quality of the second cell.

In the third feature of the present invention, the judgment unit may be configured to judge whether or not to measure the communication quality of the second cell further on the basis of at least one of a communication capability of the mobile station and judgment as to whether or not it is necessary to provide the particular service to the mobile station.

In the third feature of the present invention, the communication unit may start the communication of the mobile station in either one of the first cell and the second cell on the basis of the communication quality of the second cell included in the communication start request signal.

BEST MODES FOR CARRYING OUT THE INVENTION

Configuration of Mobile Communication System According to First Embodiment of the Present Invention A configuration of a mobile communication system according to a first embodiment of the present invention will be described with reference to FIG. 1 to FIG. 3.

Figure 1:
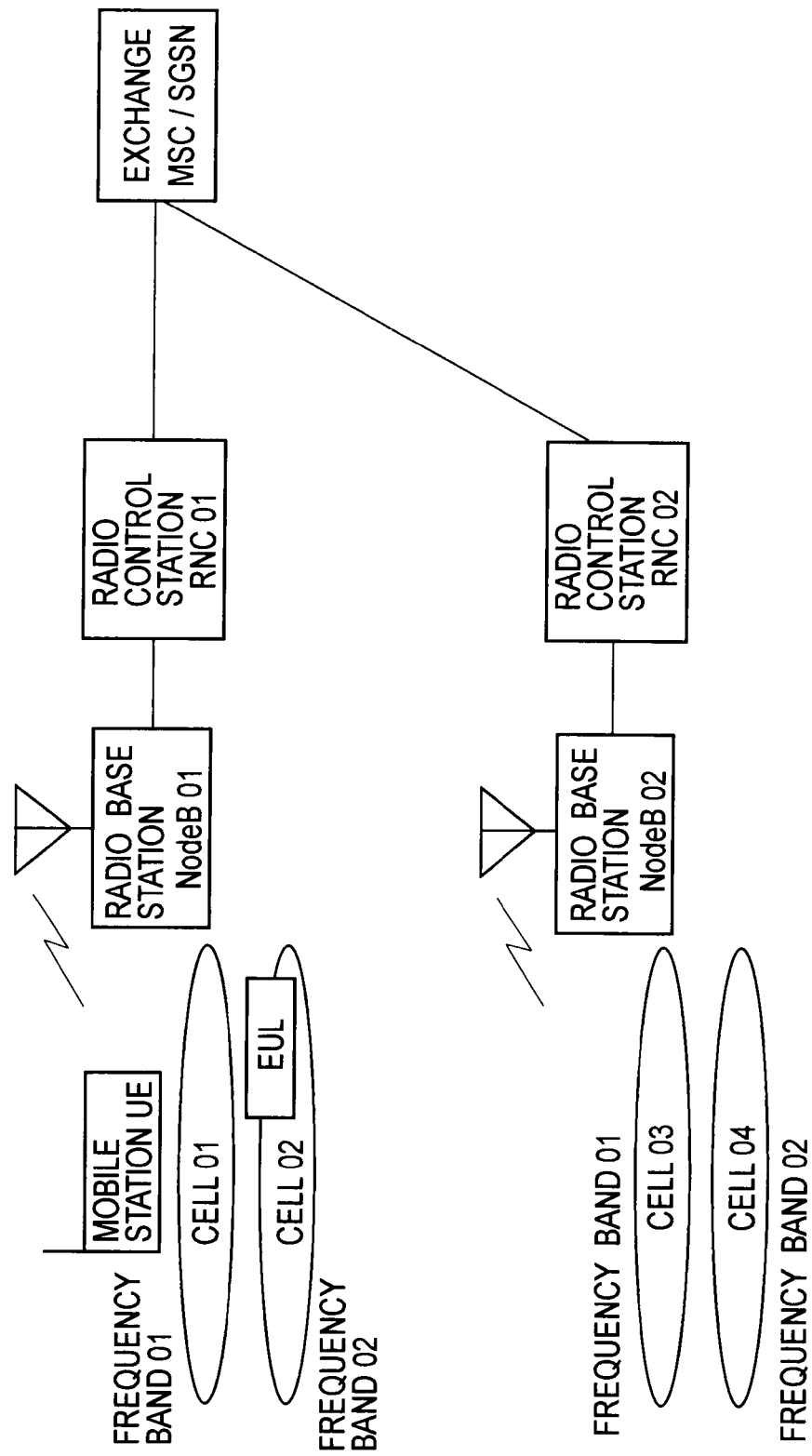
FIG. 1 is an overall configuration diagram of a mobile communication system according to a first embodiment of the present invention.

As shown in FIG. 1, the configuration of the mobile communication system according to the present embodiment is similar to the configuration of the above-described W-CDMA system.

It is general that the mobile communication system according to the present embodiment further includes apparatuses such as a home memory for storing subscriber information or a billing system, but description and explanation of those apparatuses will be omitted in the present embodiment. Although a radio base station NodeB and a radio control station RNC are described separately in the example of FIG. 1, those devices may be combined into a single device.

As shown in FIG. 1, the mobile communication system according to the present embodiment employs an overlay configuration in which a cell 01 and a cell 02 cover a geographically identical area, a cell 03 and cell 04 cover another geographically identical area, a frequency band 01 is allocated to the cell 01 and the cell 03, and a frequency band 02 is allocated to the cell 02 and 04.

Moreover, the mobile communication system according to the present embodiment has a configuration in which the cell 01 not providing an EUL service (a particular service) and the cell 02 providing the EUS service overlay each other in different frequency bands.

Figures 2, 3:
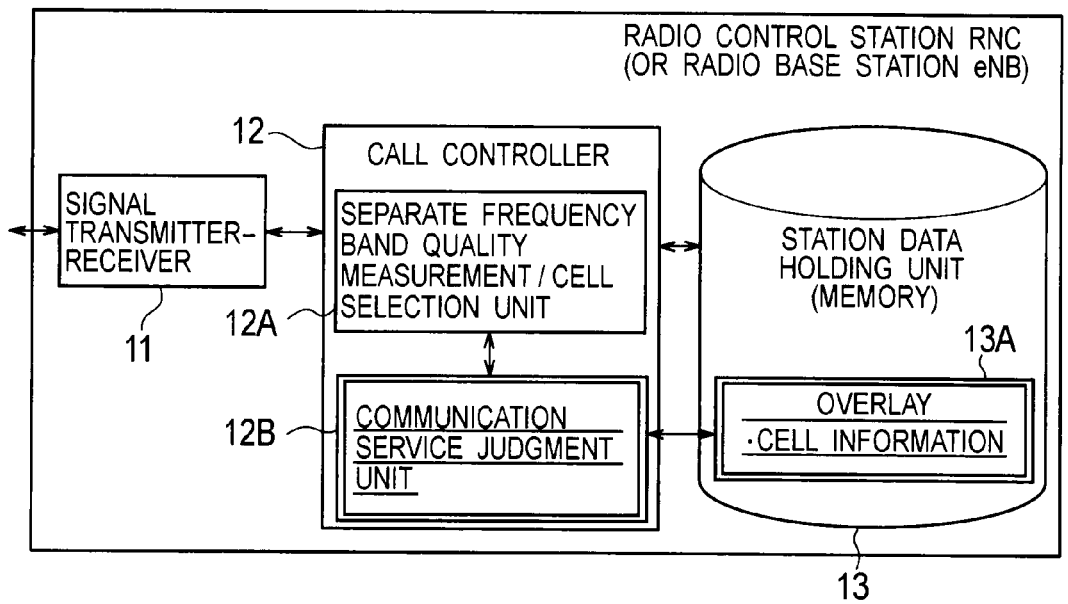
FIG. 2 is a functional block diagram of a radio control station or a radio base station according to the first embodiment of the present invention.
FIG. 3 is a view showing an example of overlay cell information retained by a station data retention unit of the radio control station or the radio base station according to the first embodiment of the present invention.

FIG. 2 shows an example of a device configuration of a radio control station RNC according to the present embodiment. As shown in FIG. 2, the radio control station RNC mainly includes a signal transmitter-receiver 11, a call controller 12, and a station data retention unit 13 provided inside a memory.

Moreover, the radio control station RNC includes a communication service judgment unit 12B in the call controller 12, in addition to a separate frequency band quality measurement/cell selection unit 12A that is deemed to be provided in the radio control station disclosed in "JP-A No. 2003-219449".

The communication service judgment unit 12B is configured to judge whether or not to measure communication quality of a cell employing a separate frequency band, on the basis of at least one of judgments as to whether or not the EUL service (the particular service) is provided in each of the cells (presence or absence of the EUL service provided in each of the cells), and as to whether or not communication quality of a second cell (a cell employing the separate frequency band) is included in a communication start request signal, the second cell overlaid by a first cell (a standby cell in which a corresponding mobile station UE is in the standby mode) in different frequency bands.

Meanwhile, the communication service judgment unit 12B may be configured to judge whether or not to measure the communication quality of the cell employing the separate frequency band, further on the basis of at least any one of a communication capability of the mobile station UE and judgment as to whether or not it is necessary to provide the EUL service (the particular service) to the mobile station UE (a need for the EUL service).

In the meantime, the separate frequency band quality measurement/cell selection unit 12A is configured to measure the communication quality of the cell (the second cell) of the frequency band which is separate from the frequency band of the standby cell (the first cell) and to determine (or to select the cell) in which one of the standby cell and the cell employing the different frequency band the mobile station should start communication, on the basis of the measured communication quality of the cell employing the separate frequency band.

To be more specific, the separate frequency band quality measurement/cell selection unit 12A may determine in which one of the first cell and the second cell the mobile station should start communication, on the basis of the communication quality of the second cell included in the communication start request signal received from the mobile station UE.

Note that the signal transmitter-receiver 11 is configured to set up any of communication for the EUL service (the particular service) and communication for a Release 99 service (an ordinary service) in the cell determined by the separate frequency band quality measurement/cell selection unit 12A.

Meanwhile, the station data retention unit 13 is configured to retain a table for managing overlay cell information shown in FIG. 3.

As shown in FIG. 3, this table stores the overlay cell information in which a "cell ID", a "frequency band", a "spreading code", and "presence or absence of the EUL service being provided" are associated with each other, the "cell ID" provided for identifying each of the overlaid cells, the "frequency band" used for transmission of each pilot channel in each of the cells, the "spreading code" used for diffusion of the pilot channel in each of the cells, and the "presence or absence of the EUL service being provided" indicating whether or not the EUL service is provided in each of the cells.

For example, when a value "0x00" is set to the "presence or absence of the EUL service being provided," the value indicates that the EUL service is not provided in the cell. When a value "0x01" is set to the "presence or absence of the EUL service being provided," the value indicates that the EUL service is provided in the cell.

(Operation of Mobile Communication System According to First Embodiment of the Present Invention)

An operation of the mobile communication system according to the first embodiment of the present invention will be described with reference to FIG. 4.

Figure 4:
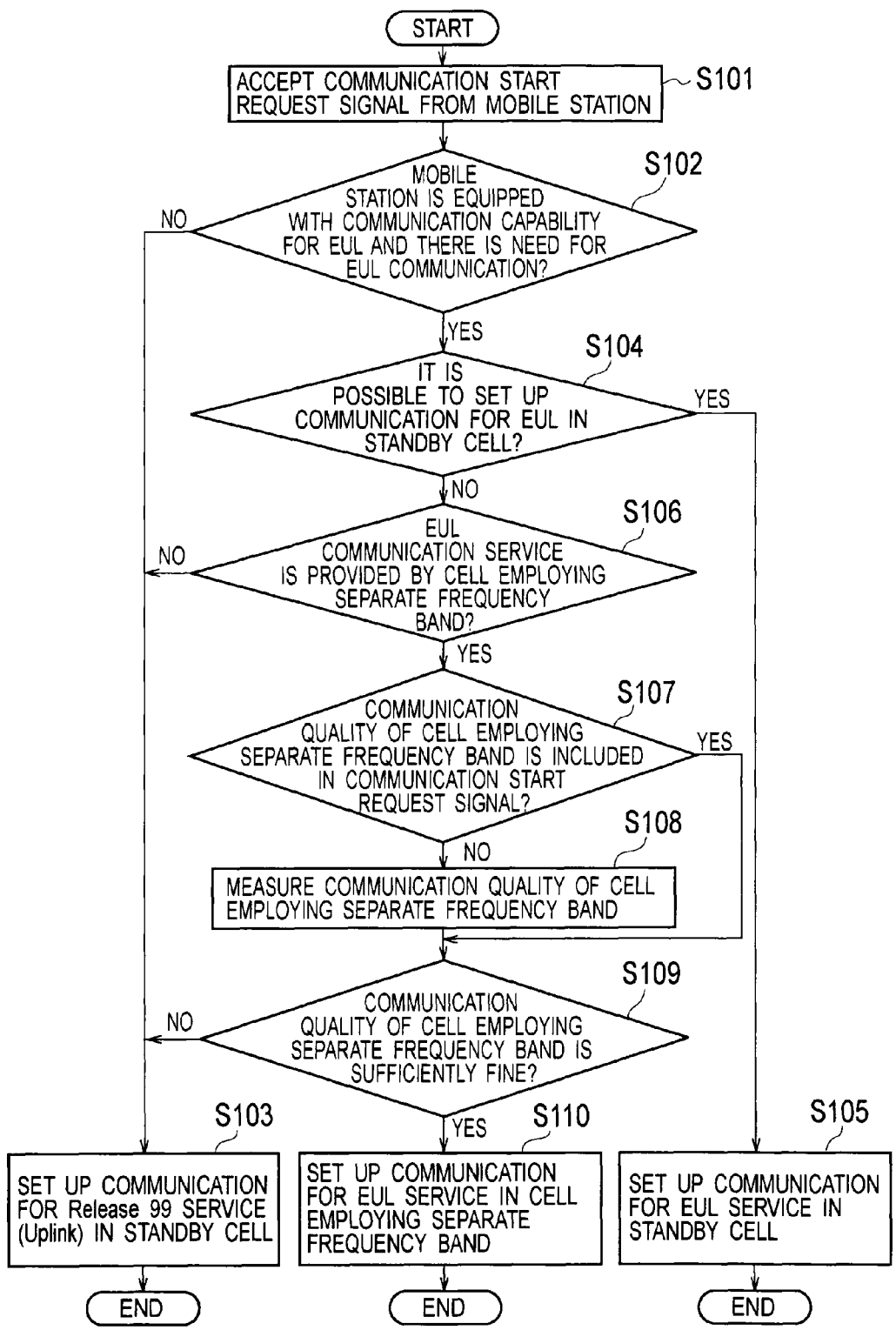
FIG. 4 is a flowchart showing an operation of the radio control station or the radio base station according to the first embodiment of the present invention.

As shown in FIG. 4, in step S101, the radio control station RNC accepts a communication start request signal from the mobile station UE which is in the standby mode.

In step S102, the radio control station RNC judges whether or not the mobile station UE is equipped with a communication capability for the EUL service and whether or not there is a need to perform the EUL service.

Here, the radio control station RNC can judge the presence or absence of the communication capability for the EUL service by use of information, and the like, the information included in the communication start request signal notified from the mobile station UE.

For example, the radio control station RNC can perform the judgment by using "UE Capability Indication" in an "RRC Connection Request" as defined in "3GPP TS25.331".

Meanwhile, the radio control station RNC can judge the need for the EUL service on the basis of information such as "information ("Measurement Report event 4a" as defined in "3GPP TS25.331", for example) as to whether or not uplink data to be transmitted exceeds a threshold" which is notified from the mobile station UE, for example.

The operation goes to step S104 when a judgment is made here that the mobile station UE is equipped with the communication capability for the EUL service and that there is a need for the EUL service.

On the other hand, if a judgment is made that the mobile station UE is not equipped with the communication capability for the EUL service or that there is no need for the EUL service, the mobile station UE sets up the communication for the Release 99 service (uplink) in step S103 in the cell in which the mobile station UE is in the standby mode instead of the communication for the EUL service.

Here, downlink communication may be performed via a HSDPA service or performed via a Release 99 service (downlink).

In step S104, the radio control station RNC judges whether or not it is possible to set up the communication for the EUL service in the cell in which the mobile station UE is in the standby mode.

When a judgment is made that it is possible to set up the communication for the EUL service in the cell, the mobile station UE sets up the communication for the EUL service in step S105 in the cell in which the mobile station UE is in the standby mode.

On the other hand, the operation goes to step S106 if a judgment is made that it is not possible to set up the communication for the EUL service in the cell.

In step S106, the radio control station RNC judges whether or not the EUL service is provided by a cell employing a frequency band separate from that of the cell in which the mobile station UE is in the standby mode.

This judgment can be executed by using means such as for causing a program or the like of the radio control station RNC to refer to the overlay cell information preset in the station data retention unit 13 of the radio control station RNC, for example.

If a judgment is made that the EUL service is not provided by the cell employing the separate frequency band, the mobile station UE sets up the communication for the Release 99 service (uplink) in step S103 in the cell in which the mobile station UE is in the standby mode instead of the communication for the EUL service.

On the other hand, the operation goes to step S107 when a judgment is made that the EUL service is provided by the cell employing the separate frequency band.

In step S107, the radio control station RNC judges whether or not the communication quality of the cell employing the separate frequency band is included in the communication start request signal transmitted from the mobile station UE.

For example, the radio control station RNC can use "Measured Results on RACH" in the "RRC Connection Request" as defined in "3GPP TS25.331", as the communication quality.

When a judgment is made here that the communication quality of the cell employing the separate frequency band is not included in the communication start request signal, the radio control station RNC instructs the mobile station UE to measure the communication quality of the cell employing the separate frequency band in step S109 and thereby acquires the communication quality of the cell employing the separate frequency band from the mobile station UE.

For example, the radio control station RNC can acquire the communication quality by using "Measurement Control/Report" as defined in "3GPP TS25.331".

As described previously, the conceivable communication qualities include an electric field intensity of a pilot channel, a SIR, an electric field loss, and the like.

In the W-CDMA system, in order to measure the pilot channel transmitted in the above-described cell employing the separate frequency band, the mobile station UE has to be supported by a "Compressed mode" method, a "Dual Receiver" method, or any other method, the "Compressed mode" method allowing the mobile station UE to make a temporal gap in a communication channel and to switch the frequency band to be measured within the gap interval, the "Dual Receiver" method providing the mobile station UE with multiple radio receivers to allow the mobile station UE to receive radio waves in the separate frequency band.

Here, the "Compressed mode" method generally has characteristics of causing a large amount of instantaneous consumption of radio resources and a large processing load on the mobile station UE, because received power before and after the gap interval is doubled to compensate a data transmission reception opportunity loss attributable to the gap.

In the meantime, if a judgment is made that the communication quality of the cell employing the separate frequency band is included in the communication start request signal, there is no need to measure the communication quality of the cell. The operation thus skips step S108 and goes to step S109.

In step S109, the radio control station RNC judges whether or not the communication quality of the cell employing the separate frequency band is sufficiently fine on the basis of the communication quality acquired by any of the above-described means.

For example, the radio control station RNC can judge whether or not the communication quality is sufficiently fine in view of such as whether or not any of the electric field intensity of the pilot channel and the SIR exceeds a predetermined threshold, whether or not the electric field loss of the pilot channel falls below a predetermined threshold.

Here, the predetermined thresholds may be fixed values retained in advance or relative values to those of the cell in which the mobile station UE is in the standby mode.

When a judgment is made that the communication quality of the cell employing the separate frequency band is sufficiently fine, the mobile station UE sets up the communication for the EUL service in the cell employing the separate frequency band in step S110.

On the other hand, if a judgment is made that the communication quality of the cell employing the separate frequency band is insufficient, the mobile station UE sets up the communication for the Release 99 service (uplink) in step S103 in the cell in which the mobile station UE is in the standby mode instead of the communication for the EUL service.

By the operation according to the present embodiment, the EUL support mobile station UE in the standby mode in the cell 01 in FIG. 1 is allowed to perform the communication for the EUL service in the cell 02 after confirmation of the communication quality of the cell 02 (but performs the communication for the Release 99 service (uplink) in the cell 01 if the communication quality of the cell 02 is sufficient).

In the conventional technique, as described previously, there is no means of judging whether or not the mobile station UE needs the communication for the EUL service with the viewpoints such as of the EUL communication capability of or an amount of data of the mobile station UE before measuring the communication quality when the mobile station UE is in the standby mode in the cell 01. Therefore, the mobile station UE is only able to perform the communication for the Release 99 service (uplink) in the cell 01 or alternatively to perform the communication for the EUL service in the cell 02 without measuring the communication quality.

Here, according to the operation of the present embodiment, the mobile station UE continues to perform the communication for the EUL service in the cell 02 when the mobile station UE is in the standby mode in the cell 02. Otherwise, the mobile station UE performs the communication for the Release 99 service (uplink) in the standby cell the mobile station UE is in the standby mode in the cell 03 or 04 because the EUL service is not provided by the overlaid cell employing the separate frequency band.

It is a common practice here for the mobile station UE in the standby mode to start the measurement of the communication quality of the cell employing the separate frequency band in preparation for transition to the cell employing the separate frequency band at a point where the communication quality falls below the predetermined threshold (referred to as "Sintersearch" according to the definition by 3GPP). Here, it is also conceivable to limit inclusion of the communication quality of the cell employing the separate frequency band into the communication start request signal, only to this occasion.

To put this the other way round, judgment can be made that the communication quality of the standby cell is sufficiently fine as long as the above-mentioned communication quality is not included in the communication start request signal. Under the condition that cell shapes are not extremely different between the overlaid cells, it is also possible to set up the communication in the cell employing the separate frequency band while skipping the measurement of the above-mentioned communication quality and the subsequent judgment of the communication quality.

This is because it is possible to judge that the communication quality of the cell employing the separate frequency band is also sufficiently fine as far as the communication quality in the standby cell is sufficiently fine and the cell shapes are substantially identical between the overlaid cells.

(Advantageous Effects of Mobile Communication System According to First Embodiment of the Present Invention)

The mobile communication system of the first embodiment of the present invention enables degradation in a service performance to be prevented by eliminating a possibility of performing communication at poor communication quality while preventing reduction in frequency to provide a particular service, in a configuration in which a cell A providing the particular service and a cell B not providing the particular service overlay each other in different frequency bands. This is because the mobile communication system of the first embodiment of the present invention includes the step of judging whether or not to measure communication quality of the cell employing the different frequency band, on the basis of the communication capability of the mobile station UE for the particular service, judgment as to whether or not it is necessary to provide the particular service to the mobile station UE (the need for the particular service), judgment as to whether or not the particular service is provided in each of the cells (presence or absence of the particular service provided in each of the cells). For this reason, the mobile communication system of the first embodiment of the present invention allows the communication for the particular service to be set up in the cell employing the separate frequency band after executing the measurement of the above-mentioned communication quality.

According to the mobile communication system of the first embodiment of the present invention, it is possible to skip the measurement of the above-mentioned communication quality as far as the communication quality of the cell employing the separate frequency band is included in the communication start request signal. Hence the mobile communication system of the first embodiment of the present invention is able to eliminate a concern that the mobile station UE starts the "Compressed mode" despite the poor communication quality of the standby cell, thus leading to further degradation in the communication quality or consumption of radio resources.

Further, according to the mobile communication system of the first embodiment of the present invention, it is possible to judge that the communication quality of the cell employing the separate frequency band is sufficiently fine as far as the communication quality of the cell employing the separate frequency band is not included in the communication start request signal and thereby to skip the measurement and the judgment of the above-described communication quality. Hence with the mobile communication system of the first embodiment of the present invention, it is possible to prevent a connection delay, a processing load, and consumption of radio resources associated with the measurement of the communication quality.

(A Mobile Communication System According to Second Embodiment of the Present Invention)

It is to be noted that the present invention is not limited only to application to the W-CDMA system as shown in the above-described first embodiment, but is applicable to any mobile communication system of any method having a configuration in which a cell providing a particular service and a cell not providing the particular service overlay each other in different frequency bands.

Figure 5:
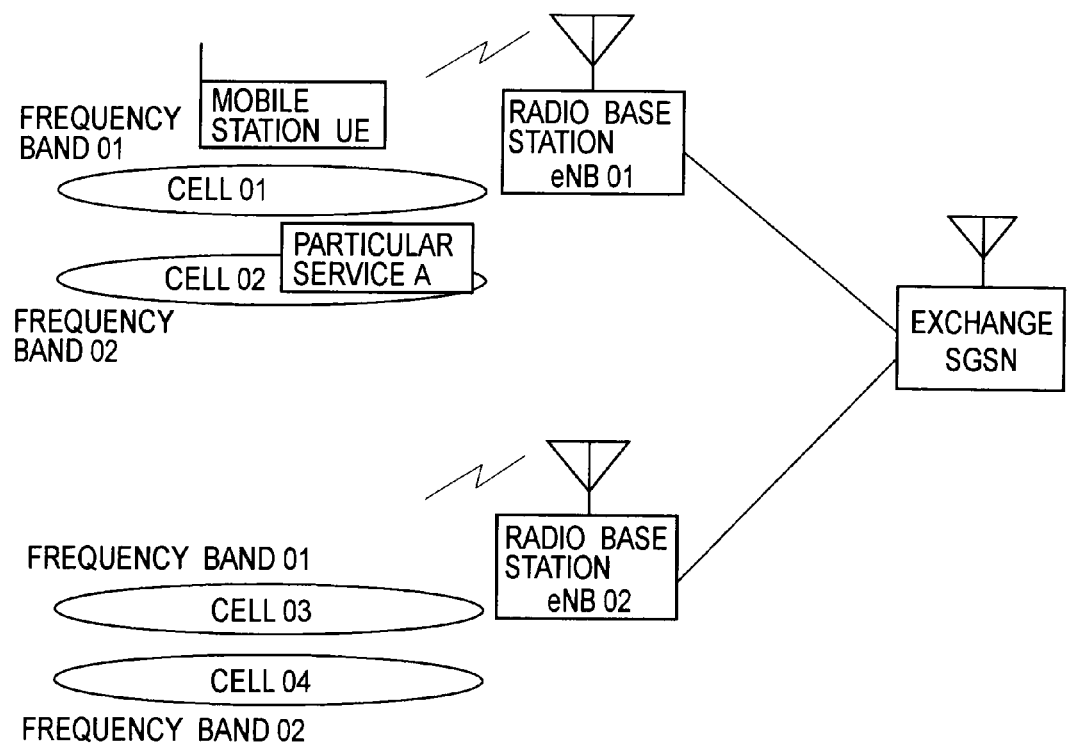
FIG. 5 is an overall configuration diagram of a mobile communication system according to a second embodiment of the present invention.

For example, the present invention is also applicable to a mobile communication system of an "LTE (Long Term Evolution)" method as in a mobile communication system according to a second embodiment of the present invention shown in FIG. 5.

As shown in FIG. 5, the mobile communication system according to the present embodiment includes a mobile station UE, radio base stations eNB, and a packet exchange SGSN (Serving GPRS Support Node), the radio base stations eNB each provided with a MAC (Media Access Control) function, a RLC (Radio Link Control) function, an RRC (Radio Resource Control) function, and the like.

Here, as shown in FIG. 2, the radio base station eNB according to the present embodiment includes the configuration of the radio control station RNC according to the above-described first embodiment and is configured to implement the functions of the radio control station RNC as explained in the above-described first embodiment.

Note that the operation of the radio control station RNC, the mobile station UE, the radio base station Node B, eNB and the exchange MSC/SGSN, SGSN may be implemented by hardware, may be implemented by a software module that is executed by a processor, or may be implemented by combination of both.

The software module may be provided in any form of storage media including a RAM (Random Access Memory), a flash memory, a ROM (Read Only Memory), an EPROM (Erasable Programmable ROM), an EEPROM (Electronically Erasable and Programmable ROM), a register, a hard disc, a removable disc, and a CD-ROM.

Such a storage medium is connected to the processor so as to allow the processor to read or write information from or to the storage medium. Alternatively, the storage medium may be integrated in a processor. Furthermore, the storage medium and the processor may be provided in ASIC. The ASIC may be provided in the mobile station UE and the radio base station eNB. Instead, the storage medium and the processor may be provided in the mobile station UE and the radio base station eNB as discrete components.

As has been described so far, the present invention has been described in detail using the embodiment. However, it is apparent for those skilled in the art that the present invention is not limited to the embodiment described herein. The present invention can be implemented as modifications and alternative embodiments without departing from the gist and scope of the present invention defined by the description of the scope of claims. Accordingly, the description herein is intended only for an exemplary purpose and has no intention to limit the present invention.

Note that the entire content of Japanese Patent Application No. 2007-294682 (filed on Nov. 13, 2007) is incorporated herein by reference.

INDUSTRIAL APPLICABILITY

As has been described, since the present invention is able to provide a mobile communication method, a radio control station, and a radio base station which are used in a configuration in which a cell providing a particular service and a cell not providing the particular service overlay each other in different frequency bands, the mobile communication method, the radio control station, and the radio base station enabling degradation in a service performance to be prevented by eliminating a possibility of performing communication at poor communication quality while preventing reduction in frequency to provide the particular service, they are useful.

The invention claimed is:

1. A mobile communication method for a mobile communication system having a configuration in which a cell providing a particular service and a cell not providing the particular service overlay each other in different frequency bands, the mobile communication method comprising:
   a step A of causing a mobile station in a standby mode in a first cell to transmit a communication start request signal;
   a step B of judging whether or not to measure communication quality of a second cell on the basis of judgment as to whether or not the particular service is provided in each of the cells and judgment as to whether or not communication quality of the second cell is included in the communication start request signal, the second cell overlaid by the first cell in a different frequency band; and
   a step C of starting communication of the mobile station in either one of the first cell and the second cell on the basis of the measured communication quality of the second cell,
   wherein in step C, communication is started in the second cell only when all of the following conditions are determined:
   (i) the mobile station is equipped with a communication capability for the particular service and the mobile station needs the particular service;
   (ii) it is not possible to set up communication for the particular service in the first cell and the particular service is provided by the second cell; and
   (iii) the communication quality of the second cell is above a predetermined threshold,
   wherein when all of conditions (i)-(iii) are not met, communication will be started in the first cell.

2. The mobile communication method according to claim 1, wherein the judgment as to whether or not to measure the communication quality of the second cell is made in the step B when it is determined that the mobile station is equipped with the communication capability for the particular service and the mobile station needs the particular service.

3. A radio control station used in a mobile communication system having a configuration in which a cell providing a particular service and a cell not providing the particular service overlay each other in different frequency bands, the radio control station comprising:
   a judgment unit configured to judge whether or not to measure communication quality of a second cell on the basis of at least one of a case where a mobile station in a standby mode in a first cell transmits a communication start request signal and/or judgment as to whether or not communication quality of the second cell is included in the communication start request signal, the second cell overlaid by the first cell in the different frequency band; and
   a communication unit configured to start communication of the mobile station in either one of the first cell and the second cell on the basis of the measured communication quality of the second cell,
   wherein the communication unit starts communication in the second cell only when all of the following conditions are determined:
   (i) the mobile station is equipped with a communication capability for the particular service and the mobile station needs the particular service;
   (ii) it is not possible to set up communication for the particular service in the first cell and the particular service is provided by the second cell; and
   (iii) the communication quality of the second cell is above a predetermined threshold,
   wherein when all of conditions (i)-(iii) are not met, the communication unit starts communication in the first cell.

4. The radio control station according to claim 3, wherein the judgment unit is configured to judge whether or not to measure the communication quality of the second cell when it is determined that the mobile station is equipped with the communication capability for the particular service and the mobile station needs the particular service.

5. A radio base station used in a mobile communication system having a configuration in which a cell providing a particular service and a cell not providing the particular service overlay each other in different frequency bands, the radio base station comprising:
- a judgment unit configured to judge whether or not to measure communication quality of a second cell when a mobile station in a standby mode in a first cell transmits a communication start request, on the basis of at least one of judgment as to whether or not the particular service is provided in each of the cells and judgment as to whether or not communication quality of the second cell is included in the communication start request signal, the second cell overlaid by the first cell in the different frequency band; and
- a communication unit configured to start communication of the mobile station in either one of the first cell and the second cell on the basis of the measured communication quality of the second cell,
- wherein the communication unit starts communication in the second cell only when all of the following conditions are determined:
  - (i) the mobile station is equipped with a communication capability for the particular service and the mobile station needs the particular service;
  - (ii) it is not possible to set up communication for the particular service in the first cell and the particular service is provided by the second cell; and
  - (iii) the communication quality of the second cell is above a predetermined threshold,
- wherein when all of conditions (i)-(iii) are not met, the communication unit starts communication in the first cell.

6. The radio base station according to claim 5, wherein the judgment unit is configured to judge whether or not to measure the communication quality of the second cell when it is determined that the mobile station is equipped with the communication capability for the particular service and the mobile station needs the particular service.

* * * * *